UNITED STATES PATENT OFFICE.

FRED M. LOCKE, OF VICTOR, NEW YORK.

INSULATOR AND COMPOSITION MATERIAL FOR INSULATING AND OTHER PURPOSES.

1,226,088.     Specification of Letters Patent.     Patented May 15, 1917.

No Drawing.     Application filed June 16, 1914. Serial No. 845,371.

*To all whom it may concern:*

Be it known that I, FRED M. LOCKE, of Victor, in the county of Ontario, in the State of New York, have invented new and useful Improvements in Insulators and Composition Material for Insulating and other Purposes, of which the following is a full, clear, and exact description.

This invention relates to certain improvements in the manufacture of insulators for high potential electric conductors, and refers more particularly to a composition electrical insulation as a new article of manufacture, and is closely related to my co-pending applicaion Serial No. 482,382, filed March 9, 1909, for manufacture of high potential porcelain and glass insulators, and to the inventions set forth in my Letters Patent No. 1,091,678, dated March 31, 1914, and No. 1,091,679, dated March 31, 1914, respectively.

The primary object of the invention is to produce a composition material susceptible of various uses but particularly for insulators for high potential electric conductors, which is unaffected by temperature and climatic changes, and to increase for insulating purposes its inductive capacity, dielectric strength and resistance to puncture or disintegration by electric current, and to reduce its co-efficient of expansion.

The composition material comprises silica and cryolite, a boron material, suitably mixed as by trituration or levigation, molded in the desired form and then fired or finished in the usual manner for forming insulators, or fused and then molded or formed for making such other desirable and suitable articles of manufacture as household ware, etc., and the proportion of cryolite used may vary from one-half of 1% to 60% of the mass, in accordance with the particular use to which the material is to be put.

Preferably in view of the difficulty of procuring pure boron, I make use of a boron compound such as borax or boracic acid; and the quantity of boron or a boron compound used may vary from one-half of 1% to 60% of the mass, according to the specific inductive capacity required or in accordance with the desired degree of susceptibility to temperature and climatic changes and conditions, or both. It is well known that cryolite is composed of a compound of sodium and aluminum fluorids and that fluorin, an element of the halogen group, which group comprises in addition to fluorin, chlorin, bromin, and iodin, constitutes more than 50% of cryolite and fluorin has a remarkable tendency to combine with silica, thereby allowing fusing of silica at a low temperature accompanied by the volatilization and escape of the fluorin from the fused mass leaving a mass having a high silica content in combination with aluminum.

I do not herein claim the broad idea of a composition body for insulating or other purposes, comprising an aluminum silicate and boron or a boron compound, which invention is claimed in my Letters Patent No. 1,091,678 and No. 1,091,679, but I here do claim the specific composition of silica and a halogen compound such as a halogen material with specific sub-claims to fluorin material, as herein set forth and embodying boron or some of its compounds, as broadly covered in the claims of my said patents and I do not limit myself to the use of this material for insulating purposes but desire to broadly claim the same for any purpose for which it may be suitable and desirable.

I claim:

1. An insulator of high silica content formed by fusing silicic material with halogen material and boron material into a homogeneous body, and molding the mass.

2. The method of forming a homogeneous body of high silica content consisting in fusing silicic material, halogen material and boron material to form a homogeneous body.

3. An insulator of high silica content formed by fusing silicic material, halogen carrying material and boron material to form a homogeneous body.

4. An insulator for high voltage current formed by fusing silicic material, boron material and halogen-carrying material to form a homogeneous body.

5. An insulator for high voltage current formed by fusing silicic material, boron material and fluorin material to form a homogeneous body.

6. A heat-resisting glass of low co-efficient of expansion formed by fusing boron material, fluorin-carrying material and a relatively large percentage of silicic material to form a homogeneous body.

7. A glass of high silica content formed by fusing silicic material, boron material and halogen material to form a homogeneous body.

8. A glass of high silica content formed by fusing silicic material, boron material and fluorin-carrying material to form a homogeneous body.

In witness whereof I have hereunto set my hand this 4th day of June, 1914.

FRED M. LOCKE.

Witnesses:
J. C. RODENBECK,
R. G. DARNS.